(12) United States Patent
Stephan et al.

(10) Patent No.: US 11,936,634 B2
(45) Date of Patent: Mar. 19, 2024

(54) METHOD FOR EDITING MESSAGES BY A DEVICE ON A COMMUNICATION PATH ESTABLISHED BETWEEN TWO NODES

(71) Applicant: Orange, Paris (FR)

(72) Inventors: Emile Stephan, Châtillon (FR); Frédéric Fieau, Châtillon (FR); Gaël Fromentoux, Châtillon (FR)

(73) Assignee: ORANGE, Issy-les-Moulineaux (FR)

( * ) Notice: Subject to any disclaimer, the term of this patent is extended or adjusted under 35 U.S.C. 154(b) by 115 days.

(21) Appl. No.: 17/255,088

(22) PCT Filed: Jun. 14, 2019

(86) PCT No.: PCT/FR2019/051440
§ 371 (c)(1),
(2) Date: Dec. 22, 2020

(87) PCT Pub. No.: WO2020/002793
PCT Pub. Date: Jan. 2, 2020

(65) Prior Publication Data
US 2021/0273926 A1    Sep. 2, 2021

(30) Foreign Application Priority Data

Jun. 25, 2018 (FR) ..................................... 1855681

(51) Int. Cl.
*H04L 9/40* (2022.01)
(52) U.S. Cl.
CPC ........ *H04L 63/0471* (2013.01); *H04L 63/062* (2013.01); *H04L 63/0281* (2013.01)
(58) Field of Classification Search
CPC ............. H04L 63/0281; H04L 2209/76; H04L 63/062; H04L 63/0471; H04L 63/306;
(Continued)

(56) References Cited

U.S. PATENT DOCUMENTS 8,700,894 B2 * 4/2014 Hammell ............ H04L 63/0464
380/278
9,413,766 B2 * 8/2016 Larson ................ H04L 61/5076
(Continued)

FOREIGN PATENT DOCUMENTS

EP        3169032 A1    5/2017
WO    WO 2018/112071 A1    6/2018

OTHER PUBLICATIONS

David M. Goldshlag, Michael G. Reed, and Paul F. Syverson. Hiding Routing Information, May 1996. Naval Research Laboratory, Center for High Assurance Computer Systems (Year: 1996).*
(Continued)

*Primary Examiner* — Khalil Naghdali
(74) *Attorney, Agent, or Firm* — Knobbe, Martens, Olson & Bear, LLP (57) ABSTRACT

The messages established on a communication path between two nodes are increasingly encrypted. However, the devices present on the communication path may intervene to transport the messages and to read, edit or add data in the messages. It may also be desirable that only "authorized" devices can carry out these actions. In order to intervene on these data, it would be necessary that the devices on the communication path have available all the keys used by the nodes to encrypt and decrypt the data of the messages, which is difficult to envisage. A modification method enables a device, capable of intercepting a data message on a communication path between two nodes, to edit the data under the control of the nodes, while ensuring that a device cannot access the data edited by another device on the path.

14 Claims, 6 Drawing Sheets

(58) Field of Classification Search
CPC . H04L 63/304; H04L 9/0827; H04L 63/0435; H04L 63/0414; H04L 9/0822
See application file for complete search history.

(56) References Cited

U.S. PATENT DOCUMENTS

| | | | | |
|---|---|---|---|---|
| 9,864,880 | B1* | 1/2018 | Gunnarson | G06F 21/78 |
| 2008/0022389 | A1* | 1/2008 | Calcev | H04W 40/28 |
| | | | | 726/14 |
| 2016/0292440 | A1 | 10/2016 | Batchu et al. | |
| 2017/0374043 | A1 | 12/2017 | Golshan et al. | |
| 2019/0268764 | A1* | 8/2019 | Wei | H04W 12/033 |

OTHER PUBLICATIONS

David M. Goldschlag, Michael G. Reed, and Paul F. Syverson, Hiding Routing Information, May 1996, Naval Research Laboratory, Center for High Assurance Computer Systems, Washington Dc. (Year: 1996).*

Imran et al., 2015 International Conference on Smart Technologies and Management for Computing, Communication, Controls, Energy and Materials "DD-SARP: Dynamic Data Secure Anonymous Routing Protocol for MANETs in Attacking Environments", pp. 39-46 (Year: 2015).*

International Search Report and Written Opinion dated Aug. 22, 2019 for Application No. PCT/FR2019/051440.

Goldschlag et al., Hiding Routing information, Information Hiding, Springer Berlin Heidelberg, Berlin, Heidelberg, pp. 137-150, (May 30, 1996).

* cited by examiner

METHOD FOR EDITING MESSAGES BY A DEVICE ON A COMMUNICATION PATH ESTABLISHED BETWEEN TWO NODES

RELATED APPLICATIONS

This application is the U.S. National Phase of Application No. PCT/FR2019/051440 entitled "METHOD FOR EDITING MESSAGES BY A DEVICE ON A COMMUNICATION PATH ESTABLISHED BETWEEN TWO NODES" and filed Jun. 14, 2019, which claims the benefit of French Patent Application No. 1855681, filed Jun. 25, 2018, each of which is incorporated by reference in its entirety.

FIELD OF THE INVENTION

The field of the invention is that of telecommunications infrastructures in which secure sessions are established on paths between end nodes and modified by what are referred to as intermediate equipments.

PRIOR ART

Communications established between two end nodes, for example between a client and a server, are increasingly encrypted, at least from the transport layer and up to the application layer in the TCP/IP (Transmission Control Protocol/Internet Protocol) model. Lower layers are generally not encrypted to allow packets to be routed through the communication infrastructure.

In particular, the use of HTTP over TLS (HyperText Transfer Protocol over Transport Layer Security) sessions proposing the encryption of the HTTP protocol data, initially mainly used for banking transactions, has expanded widely for various web applications, including for applications relating to social networks.

Likewise, the QUIC (Quick UDP Internet Connections) protocol, a new transport protocol currently being standardized and described in the IETF document (draft-ietf-quic-transport-12) based on the UDP (User Datagram Protocol) protocol, is increasingly used for communications as a transport protocol, in particular with respect to the TCP protocol. This QUIC protocol natively integrates security functions, such as TLS functions, thus allowing communications based on this protocol to be secured without requiring an additional security protocol.

In this context of encryption of communication data, the equipments deployed on the communication paths established between the end nodes, between which a communication path is established in order to transport the application session data, see their role reduced to routing messages and are no longer able to add or modify data to these messages. Thus, if a transport protocol such as QUIC is used for communications, the encryption of data in the QUIC protocol and in application protocols such as HTTP, SIP (Session Initiation Protocol), SMTP (Simple Mail Transfer Protocol) cannot be read or modified by equipments on the path. To be able to intervene in these data, it would be necessary for the equipments in the communication path to have all of the keys used by the end nodes to encrypt and decrypt the message data, which is difficult to envisage, in particular because the equipments on the path are most commonly managed by administrative entities distinct from those which manage the communication end nodes.

However, the equipments present on the communication paths must intervene, in certain cases or for certain services, not only to route messages but also to read, modify or add certain data to the messages. Thus, these equipments perform, for example, web optimization, requiring modifications at the application level, or perform filtering functions at the transport and/or application level, or perform stream identification functions, requiring the ability to read the transport data and the application data of the messages.

In addition, it is also desirable for only equipments "authorized" by the end nodes to be able to perform these actions. Specifically, access to message data and the modification of same is undesirable for an equipment which succeeds in placing itself on the communication path fraudulently. The development of encryption of communications at the transport and application level prevents any access by intermediate equipments, and does not allow these intermediate equipments to be able to intervene in the data of messages exchanged between two nodes.

The object of the present invention is to overcome these drawbacks.

DISCLOSURE OF THE INVENTION

The invention improves the situation using a method for modifying a data message sent by a first node to a second node on a path of a communication network, the second node having obtained a set of encryption variables from the first node, the method being intended to be executed by an equipment capable of intercepting the data message, the method comprising the following steps:
- intercepting the data message from the first node and destined for the second node;
- obtaining an encryption parameter specific to the equipment and relating to a variable of the set from the first node;
- determining a cryptographic element relating to the obtained parameter;
- modifying at least one datum of the message on the basis of the determined cryptographic element;
- transmitting the modified data message to the second node.

The invention allows equipments placed on the communication path to be able to apply processing to data exchanged in a secure manner between nodes, such as a client and a server. An equipment referred to as intermediate, that is to say on the communication path, may for example obtain an encryption parameter by configuring an encryption key, following an agreement registered between the handler of the first node and the handler of the equipment. The encryption parameter may be a public encryption key and the encryption variable may be a private key associated with the public key. An encryption parameter therefore relates to an encryption variable. The first node thus selects the equipments on the path which will be able to modify the data messages and provide them with an encryption parameter. A first equipment on the path, by using the encryption parameter, which is specific to it, to create a cryptographic element, prevents other equipments on the path from reading or modifying the data that the first equipment will have modified. Specifically, the modification of the data by an equipment was carried out by using the cryptographic element from the encryption parameter that only it can use, and only the second node, receiving the data messages transmitted by the first node and intercepted and modified by the various authorized equipments on the path, will be able to access the data modified by the various equipments by virtue of the encryption variables exchanged beforehand with the node sending the data.

The intervention thus allows equipments on the path, duly authorized by the first node, to be able to modify data transmitted by this first node.

The encryption parameter is specific to an equipment because when a plurality of equipments may intervene on a given path, it is important to be able to unambiguously identify the equipment which has modified the data message. The use of encryption parameters, such as specific encryption keys per equipment, not only makes it possible to ensure confidentiality of the modifications made by an equipment with respect to other equipments but also to be able to identify the equipment which has actually modified the data.

According to one aspect of the modification method, the encryption parameter is obtained in the received data message.

The method thus implemented avoids having to send an encryption parameter to the equipment beforehand and makes it possible to use the data messages for the purposes of sending the encryption parameters. The equipments on the path use the various parameters present in the data message to determine their own cryptographic element.

According to one aspect, the modification method further comprises a step of removing the encryption parameter from the data message sent to the second node.

The method may thus be implemented while preventing other equipments placed on the path from being able to fraudulently or accidentally modify the data that have already been modified by another equipment located upstream on the path. Any equipment on a communication path may modify the data in a secure manner and without risking this modified data being used by other equipments with the exception of the second node since the encryption parameter is removed by the equipment which has used it.

According to one aspect of the modification method, the encryption parameter is in the transport layer of a data message packet.

Transport protocols are undergoing rapid evolution and it is advantageous to make use of the free spaces provided in recently specified and increasingly used transport protocols, such as for example the QUIC protocol. The advantage of using a transport protocol for the transport of data messages that the equipment may modify is that it can be used for a wide variety of applications.

According to one aspect, the modification method further comprises a step of adding the cryptographic element to the data message sent to the second node.

The second node, on receiving the data message, also obtains the cryptographic elements of the various equipments located on the path. This thus allows it to hold the encryption parameters and the cryptographic elements in order to be able to read the data modified by the intermediate equipments.

According to one aspect of the modification method, the cryptographic element is determined on the basis of a random number present in the received data message.

A node may send a message comprising random numbers that the various equipments on the path may use. An equipment may advantageously use the received random number, and encrypt it with a public key specific to the equipment, in order to be able to be identified and authenticated. Thus the equipment modifying the data message can be authenticated.

According to one aspect of the modification method, the cryptographic element is specific to the communication path.

The cryptographic element determined by the equipment may be specific to the communication path so as to prevent an equipment which has determined this element from being able to reuse it on another communication path, for the same communication or for a separate communication. The safety of the method is thus improved.

The various aspects of the modification method which have just been described may be implemented independently of one another or in combination with one another.

The invention also relates to a method for controlling the modification of a data message sent by a first node to a second node on a communication path between the two nodes, the modification being executed by an equipment capable of intercepting the data message, the method being intended to be executed by the first node and comprising the following steps:

receiving a request message for the establishment of a communication path from the second node;

generating a set of encryption variables;

sending an establishment response message comprising the set of generated variables to the second node;

delivering an encryption parameter specific to the equipment and relating to a variable of the set to the equipment;

sending a data message comprising the encryption parameter to the second node.

The control method is initialized during the establishment of the communication, and thus has the advantage of being able to be implemented for all of the data messages exchanged between the nodes. The data messages are application-type messages, for example HTTP, SMTP (Simple Mail Transfer Protocol), RTSP (Real Time Streaming Protocol), or DNS (Domain Name System), ICMP (Internet Control Message Protocol) or SIP (Session Initiation Protocol) messages. The encryption variables are sent to the second node so that it is able to decrypt the data modified by the equipments on the communication path. Thus, only the nodes have access to the various items of information modified by the equipments located on the path. The method allows an equipment, duly authorized by the received encryption parameter, to modify data in a secure manner since the encryption parameter is specifically assigned to it.

According to one aspect of the control method, the encryption parameter is a public encryption key and the cryptographic element is a random number encrypted using the public encryption key.

Since the private keys are only exchanged between the two nodes and since each corresponding public key is provided to each equipment, only the nodes are able to access the modifications made by the respective equipments to the data message. The equipment receives a random number in the data message and encrypts it using a distributed public key.

The invention also relates to a device for modifying a data message sent by a first node to a second node on a communication path established between the two nodes, the second node having previously obtained a set of encryption variables from the first node, the device comprising:

an intercepting module, capable of intercepting the data message from the first node and destined for the second node;

an obtaining module, capable of obtaining an encryption parameter relating to a variable of the set from the first node;

a determining module, capable of determining a cryptographic element from the obtained parameter;

a modifying module, capable of modifying at least one datum in the message on the basis of the determined cryptographic element;

a transmitter capable of sending the modified data message to the second node.

This device is capable of implementing, in all of its embodiments, the modification method which has just been described.

The invention also relates to a device for controlling the modification of a data message sent by a first node to a second node on a communication path between the two nodes, the modification being executed by an equipment capable of intercepting the data message, the device comprising:

a receiver, capable of receiving a request message for the establishment of the communication path from the second node;

a generating module, capable of generating a set of encryption variables;

a transmitter, capable of sending an establishment response message comprising the set of encryption variables to the second node;

a delivery module, capable of delivering an encryption parameter, relating to a parameter of the set, to the equipment;

a transmitter, capable of sending a data message to the second node.

This device is capable of implementing, in all of its embodiments, the control method which has just been described.

The invention also relates to a system for modifying a data message sent by a first node to a second node, the modification being executed by an equipment on at least one communication path between the two nodes, the system comprising:

an equipment comprising a device for modifying the data message such as that which has just been described;

a first node, comprising a device for controlling the modification of the data message, such as that which has just been described;

a second node comprising:

a transmitter, capable of sending a request message for the establishment of a communication path to the first node; and a receiver, capable of receiving an establishment response message comprising the set of encryption variables from the first node, and capable of receiving the data message from the first node.

The invention also relates to a computer program comprising instructions for implementing the steps of the modification method which has just been described, when this program is executed by a processor, and a computer program comprising instructions for implementing the steps of the control method which has just been described, when this program is executed by a processor.

The invention also relates to a data medium that is readable by an equipment capable of sending, intercepting or receiving a data message, and comprising instructions for one or the other of the computer programs as mentioned above.

The programs mentioned above may use any programming language, and be in the form of source code, object code, or code intermediate between source code and object code, such as in a partially compiled form, or in any other desirable form.

The data media mentioned above may be any entity or device capable of storing the program. For example, a medium may comprise a storage means, such as a ROM, for example a CD ROM or a microelectronic circuit ROM, or else a magnetic recording means.

Such a storage means may for example be a hard disk, a flash memory, etc.

However, a data medium may be a transmissible medium such as an electrical or optical signal, which may be routed via an electrical or optical cable, by radio or by other means. A program according to the invention may in particular be downloaded from an Internet-type network.

Alternatively, a data medium may be an integrated circuit into which a program is incorporated, the circuit being suitable for executing or for being used in the execution of the methods in question.

PRESENTATION OF FIGURES

Other advantages and features of the invention will become more clearly apparent from reading the following description of one particular embodiment of the invention, given by way of illustrative and non-limiting example, and the appended drawings, in which.

DETAILED DESCRIPTION OF AT LEAST ONE EMBODIMENT OF THE INVENTION

In the remainder of the description, examples of a plurality of embodiments of the invention in a communications network are presented. The communication network may equally be a fixed-type communication network or a mobile/wireless-type communication network. The network may also be a hybrid network integrating a wired portion and a wireless portion.

Figure 1:
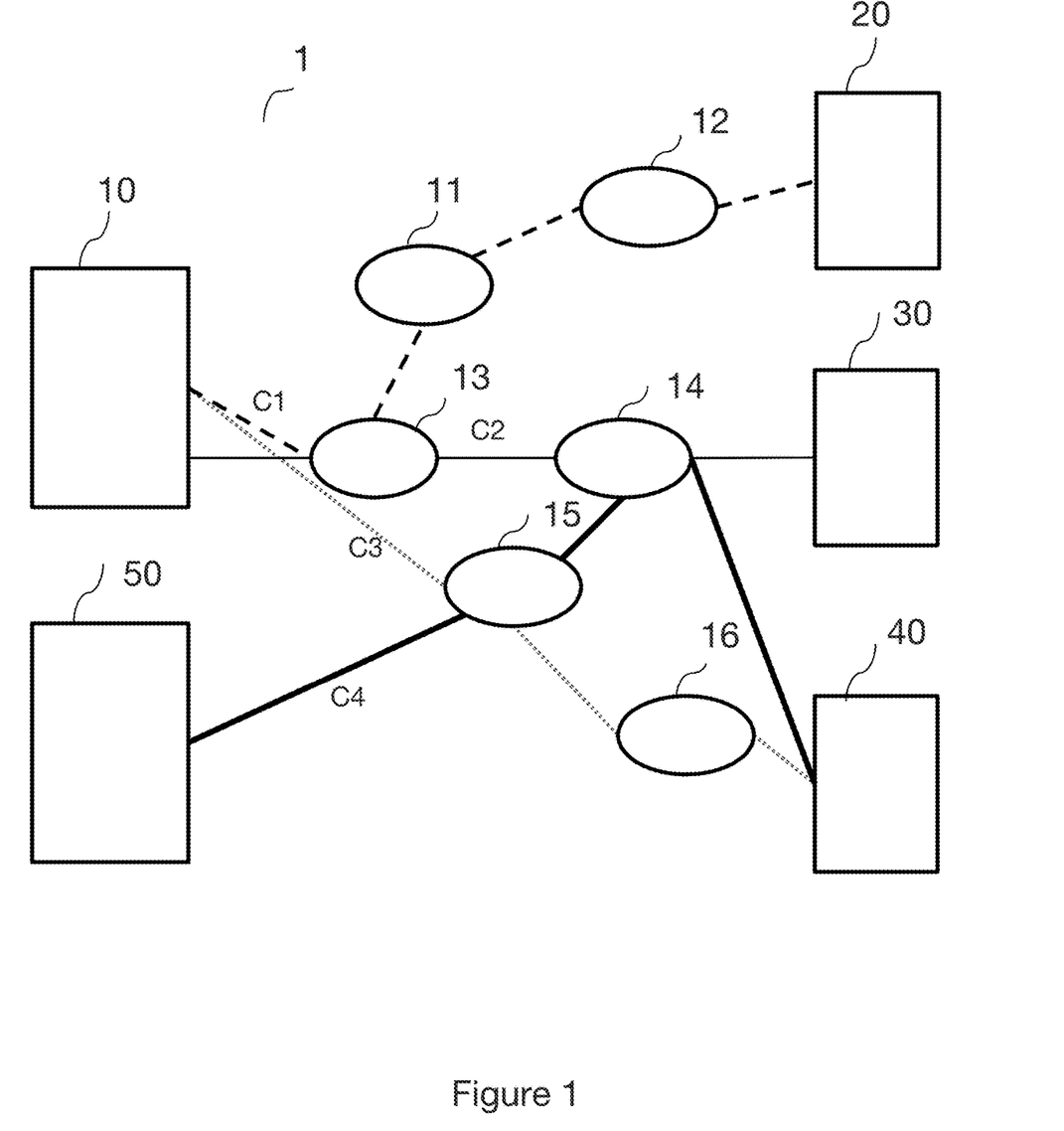
FIG. 1 shows a simplified view of a communication network in which the modification method is implemented.

Reference is made first of all to FIG. 1 which presents a simplified view of a communication network in which the modification method according to one aspect of the invention is implemented.

Two nodes 10 and 50, which may be for example mobile terminals such as smartphones or fixed terminals such as home gateways or any equipment provided with communication means, are attached to a communication network 1. Other nodes 20, 30, 40, which may be HTTP servers, DNS (Domain Name Server) servers, FTP (File Transfer Protocol) servers or even nodes of the same type as the nodes 10 and 50, are also attached to the communication network 1. The communication network 1 allows the nodes 10, 50 on the one hand and 20, 30, 40 on the other hand to be able to exchange data, for example by establishing application sessions between the nodes.

The communication network 1 comprises communication paths C1, C2, C3, C4. These paths comprise equipments which route the data from the nodes and links, whether wired or non-wired, interconnecting the equipments. The path between one node and another node may be selected according to quality of service criteria, management criteria, characteristics specific to the end nodes or application constraints. In particular, the operator of the network 1 may implement routing policies for routing the data from the various nodes attached to the network 1. In the network 1, the path C1 routes the data from the node 10 to the node 20 and comprises the equipments 13, 11, 12. The path C2, routing data from the node 10 to the node 30, comprises the equipments 13 and 14. The path C3 routes the data from the node 10 to the node 40 and comprises the equipments 15 and 16. The path C4 routes the data from the node 50 to the node 40 and comprises the equipments 15 and 14. A path may route data sent by distinct nodes to nodes which may also be distinct. The path is then shared for a plurality of data sessions.

One and the same session may also use several paths. For example, the node 10 could send data to the node 20 using several paths, for example to make data transfer more reliable or to benefit from greater transmission capabilities. In addition, a path may be unidirectional or bidirectional. In the case of a unidirectional path, the data from the node 10 to the node 30 are routed via a different path from the data sent by the node 30 to the node 10. In the case of a bidirectional path, the data follow the same path regardless of the sender or receiver of the data. The data in a bidirectional path may need to be processed by the same equipments on the path but an equipment may, in certain cases, only modify data transmitted in a given direction. A bidirectional path is said to be symmetrical if the same equipments intervene in both directions. The equipments 11, 12, 13, 14, 15, 16 of the paths C1, C2, C3, C4 have routing capabilities but they also have processing capabilities. They can thus modify the messages transmitted by the nodes either by extracting data, or by adding data, or by changing data, all of these operations consisting in modifying the data sent by the nodes. Modification or extraction of data is possible if these data are not encrypted in the message. For example, these nodes may perform operations for optimizing HTTP (Hypertext Transfer Protocol) functions, address translation, data filtering, lawful interceptions, data security, etc.

Figure 2:
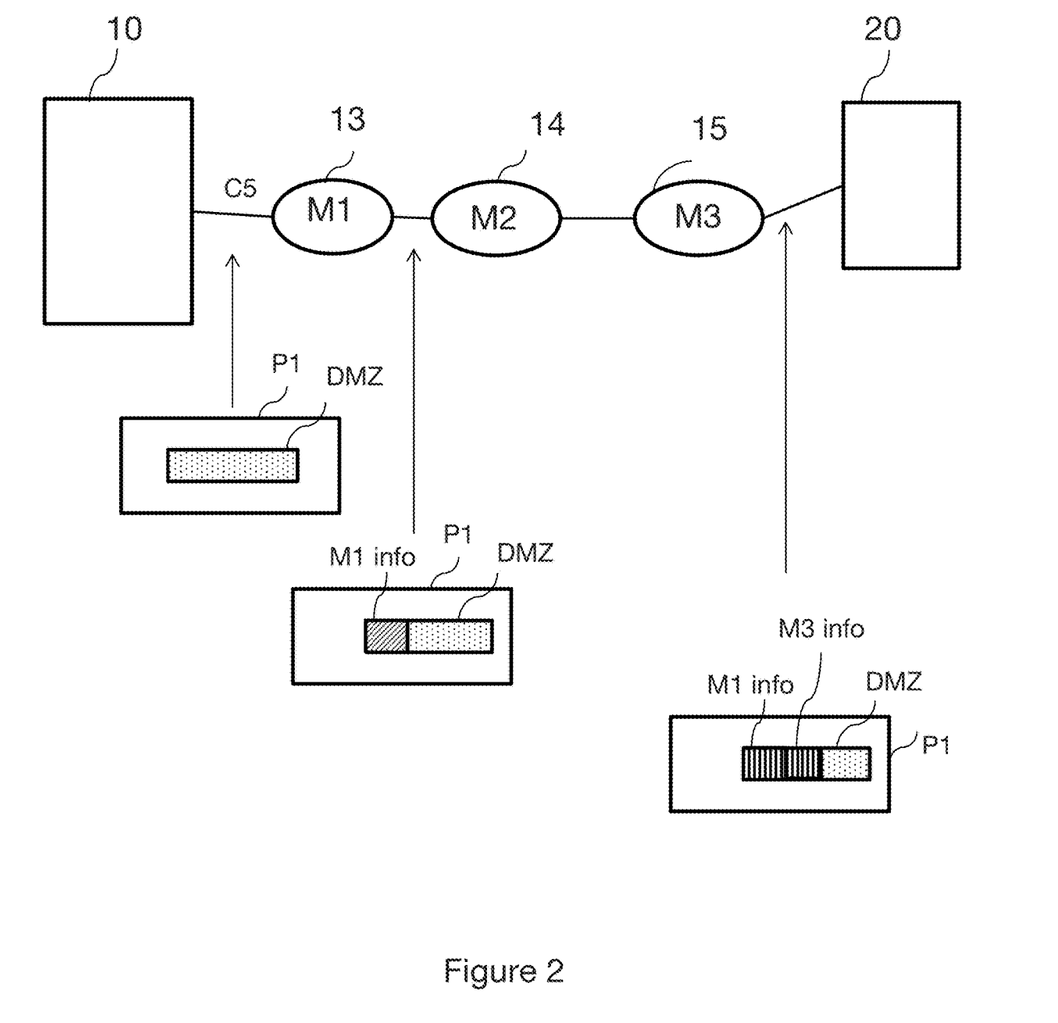
FIG. 2 shows the modification method according to a first embodiment of the invention.

With reference to FIG. 2, an outline of the modification method is presented, according to a first embodiment of the invention. In this embodiment, the node 10, which is considered to be a terminal in this embodiment, establishes an application session with the node 20, which is considered to be an HTTP server. The data of the application session are transmitted on the path C5. The data are routed from the terminal 10 to the server 20 and are processed by the three equipments M1 13, M2 14 and M3 15 located on the path C5. The equipments are referred to as intermediate, because they are located between the two what are referred to as end nodes 10 and 20 on the path C5. The equipments M1, M2, M3 must be able to intervene in the transmitted data if the nodes 10 and 20 authorize them to do so. Thus, the equipment M1, according to one example, adds quality-of-service information, while the equipment M2 extracts information from the data for legal reasons and the equipment M3 substitutes information from the data for example in order to mask information from the recipient node 20. The number of equipments on the path is not limited and the equipments may be managed by a single or distinct entity.

The terminal 10 transmits a packet P1 to the server 20. This packet comprises a header, including information making it possible to route the packet on the path C5 and other information, for example quality-of-service information, and what is referred to as payload information corresponding to application data. It is for example an HTTP request. In the packet P1, a DMZ field is present so that it can be used by the intermediate equipments on the path C5. This DMZ field is an exchange zone that the intermediate equipments use to modify certain packet data. The DMZ field may for example be a packet padding field used for the purposes of the modification method. It may also be a field of a transport protocol or of an application protocol.

The equipment M1 intercepts the packet P1 and uses a portion of the DMZ field to add information relating to the quality of service. The equipment uses a field M1 Info, which may or may not be assigned to it. Specifically, the DMZ field may include fields specifically allocated to the equipments on the path, or else a single field that each intermediate equipment may use as it needs. The information M1 info is encrypted using an encryption key specific to the equipment M1, obtained beforehand, from the terminal 10 or from the server 20 so that other equipment on the path C5 cannot read or modify the data modified by M1.

The equipment M2 intercepts the packet P1 but does not make any modification, either because it is not authorized to modify by the end nodes, or because the packet does not carry information that it must modify. An equipment may or may not be authorized to modify the packet P1 by virtue of a key allowing it to modify the packet for example, this key being transmitted to it independently in this embodiment. Thus, in the case where the packet has been encrypted by the terminal 10, the equipment M2 may modify encrypted data of the packet only if it holds a decryption key allowing it to be able to access the encrypted data of the packet P1 using a key corresponding to the encryption key used to encrypt the data. The terminal may thus encrypt some data with one key and other data with another key. The equipment M2 transmits the packet P1 to the server 20.

The equipment M3 intercepts the packet P1 and also modifies information in the packet P1. For example, it substitutes information in the packet P1 to mask the information relating to the terminal 10. This may in particular be useful if the packet passes to a network managed by an entity different from that which manages the equipment M3 in order to reach the server 20. The equipment 20 therefore modifies the packet P1 and indicates it in an unused portion of the DMZ field. It should be noted that the data M1 info encrypted by the equipment M1 are not accessible to either the equipment M2 or the equipment M3. The equipment M3 may add information M3 info to the DMZ field and it encrypts this information using an encryption key which is specific to it. It may encrypt only the information that it has added or else all of the information M1 info and M3 info. In this case, the data M1 info are encrypted by the equipment M1 and then by the equipment M3, while the data added by the equipment M3 are only encrypted by the equipment M3.

The packet P1 comprising the fields M1 info and M3 info, encrypted by the equipments M1 and M3, respectively, is then sent to the server 20. The server 20, having encryption variables, which are in this case encryption keys used by the equipments 13 and 15, may access the data M1 info and M3 info. Specifically, the server 20 has obtained from the terminal 10 the keys used by the equipments 13 and 15 for the session between the terminal 10 and the server 20. These keys are for example transmitted by the server 20 to the equipments during the establishment of the session, providing the server 20 with control over modifications.

The server 20 may also verify the received packet P1 in order to control the modifications made by the equipments on the path. In particular, the server 20 can identify whether data has been modified using keys which it does not hold or whether modifications have been made to the packet P1 by different equipments using the same key. In the event that the server 20 detects that a modification has been made without authorization, it may decide to delete the packet, or transmit a message to the terminal 10 to interrupt the sending of data, for example.

It should be noted that, depending on the type of message exchanged between the terminal 10 and the server 20, the respective roles of the terminal 10 and of the server 20 may be reversed and the session may be established from the server 20 to the terminal 10.

Figure 3:
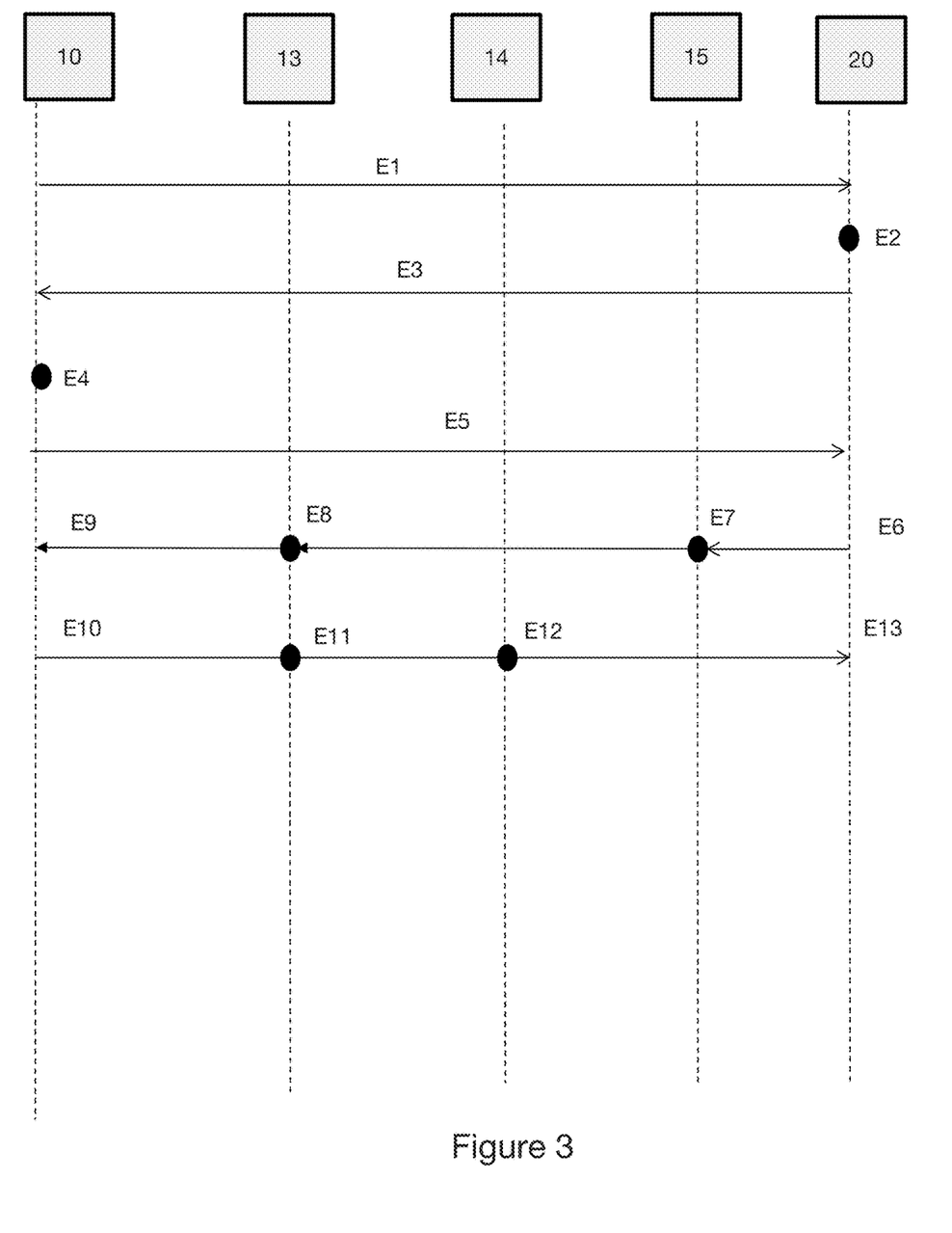
FIG. 3 shows the modification method in a communication network according to a second embodiment of the invention.

Reference is now made to FIG. 3 which presents an outline of the modification method according to a second embodiment of the invention.

The entities 10, 13, 14, 15 and 20 correspond to the identically numbered entities in FIG. 2.

The protocol used in this embodiment is the QUIC protocol. Another protocol such as TLS could also be used.

In step E1, the terminal 10 transmits a session establishment message "Client HELLO" to the server 20.

In step E2, the server 20 determines a set of encryption variables. In this example, these are the private encryption keys a', b', c', d' and the public encryption keys a, b, c, d corresponding to the private keys. The server may thus generate as many keys as necessary according to the means available to it, for example using a computer. It is also possible to generate keys during a session in order to increase security, which requires that the generated keys are then transmitted to the terminal 10.

In step E3, the server 20 sends to the client 10 a message of the type "Server HELLO" comprising the private keys a', b', c', d' determined in step E2. Advantageously, the messages "Client HELLO" and "Server HELLO" transmitted in respective steps E1 and E3 are encrypted so that they can only be read by the terminal 10 and the server 20. They could also be secret keys, which require prior exchanges between the server 20 and the terminal 10.

In step E4, the terminal 10 stores the received encryption keys so as to be able to later decrypt the data messages from the server 20.

In step E5, the terminal 10 sends a request for obtaining a content to the server 20. The request for obtaining the content may for example be an HTTP request.

Step E6 corresponds to the sending of HTTP data by the server 20 to the terminal 10 following receipt of the request in step E5. The data message, according to one alternative, further comprises the encryption parameters relating to the variables a', b', c', d'. In this embodiment, they are public keys a, b, c, d determined by the server 20 during step E2. The keys are preferably transmitted clear, that is to say unencrypted so that the equipments on the path may use them without requiring additional keys. In a step E7, the message comprising the data from the server 20 is intercepted by the equipment 15. The equipment 15 extracts a first public key, for example the public key a. The equipment 15 adds data to a field of the message, for example to the padding field of the transport protocol. This may be information indicating that data in the message have been modified or data specific to the equipment 15 to be transmitted to the terminal 10. Once the data have been modified, it encrypts the field to which it has added the modified data using the public key a and it extracts this key a from the message to be transmitted to the terminal 10. Thus, another equipment cannot reuse the key a to access the data modified by the equipment 15 or to make modifications using this key since the key a is no longer present in the modified message routed by the equipment 15. A key may thus be used only by one equipment.

In step E8, the equipment 13 intercepts the data message in turn, now comprising only the public keys b, c, d initially sent by the server 20 and routed via the equipment 15. The equipment 13 performs operations comparable to operations performed by the equipment 15, modifying the data of the received message but encrypting the modified data using the public encryption key b and removing it from the message to be sent to the terminal 10. The equipment 13, according to one alternative, encrypts with the key b only the data which it has added or else, according to another alternative, the data added by the equipment 15 and encrypted with the key a, in addition to its data. In this latter alternative, the data added by the equipment 15 are encrypted with the key a and then with the key b while the data added by the equipment 13 are only encrypted with the key b.

The message is then sent to the terminal which receives it in step E9. The message comprises the data sent by the server 20, which have been modified by the equipments 15 and 13, and the data of which added by the equipments 15 and 13 are encrypted with the public keys a and b, respectively. The message received by the terminal 10 further comprises the public keys c and d which have not been used by any equipment on the path. The terminal 10, holding the private keys a' and b' stored in step E4, is able to decrypt the information modified by the equipments 15 and 13. It only has to use the private key corresponding to the last public key not present in the received message to decrypt the last portion modified. If the equipment 13 has encrypted all of the portions modified, both by it and by the equipment 15, the terminal 10 accesses the modification by the equipment 13 as well as the modification by the encrypted equipment 15. Then, using the private key a', the terminal 10 can decrypt the portion modified by the equipment 15. Thus, only the terminal 10 can access all of the data modified by the equipments 13 and 15.

In step E10, the terminal 10 sends an HTTP request message to the server, for example to obtain another content following the data retrieved in step E9.

The message is intercepted by the equipments 13 and 14 on the path of the communication network between the terminal 10 and the server 20. In a manner comparable to steps E6 to E9, steps E10 to E13 include the transmission of the message by the terminal 10, the modification of this message by the equipments 13 and then 14 and reception by the server 20. It should be noted that the equipments involved in steps E7 and E8 on the one hand and E11 and E12 on the other hand are not the same, which may be the case when the paths are not symmetrical.

Figure 4:
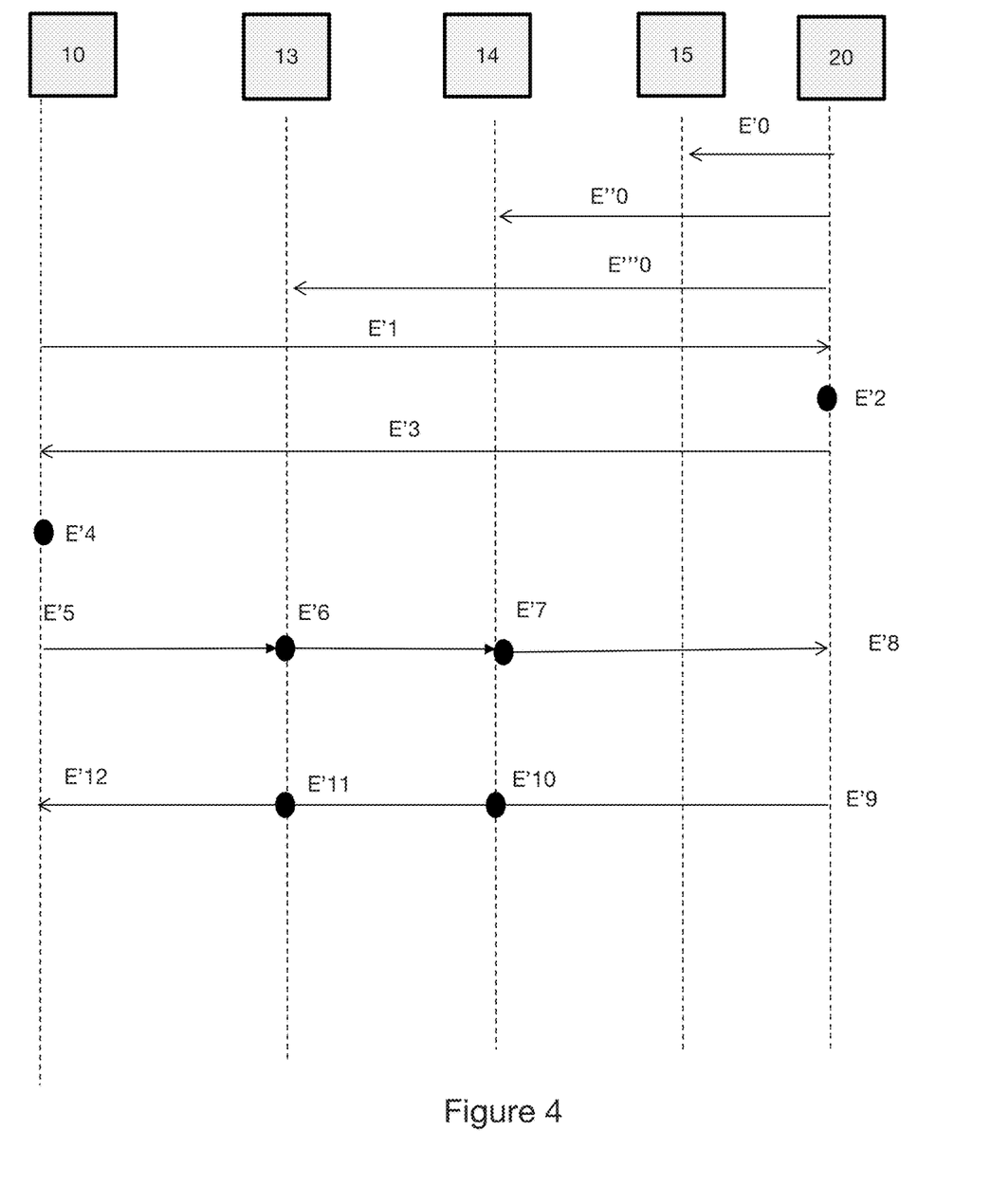
FIG. 4 shows the modification method in a communication network according to a third embodiment of the invention.

Reference is now made to FIG. 4 which presents an outline of the modification method according to a third embodiment of the invention.

In this embodiment, an agreement is signed beforehand between the handler of the server 20 and the respective handlers of the equipments 13, 14, 15. The server 20 transmits to the equipments 15, 14, 13 their respective public encryption key K1, K2, K3 in steps E'0, E"0 and E'"0. Thus each equipment has obtained an encryption key from the server 20.

In step E'1, the terminal 10 sends a session establishment message to the server 20. This may be a SYN-type message if it is a TCP (Transport Control Protocol) session.

In step E'2, the server 20 determines random numbers x, y, z also called nonces. Like for the keys in the second embodiment, it is possible to envisage determining different nonces during a session between the server 20 and the terminal 10, in particular in order to increase the security of the data exchanged during the session.

In step E'3, the server 20 transmits to the terminal 10 the determined nonces x, y, z and the encryption variables, the private encryption keys K'1, K'2, K'3 corresponding to the encryption parameters which are the public keys K1, K2, K3 transmitted to the equipments 15, 14, 13.

In step E'4, the terminal stores the received nonces x, y, z and the private keys K'1, K'2, K'3 received in step E'3.

In step E'5, the terminal 10 sends a request to the server 20 in order to obtain a content, for example by transmitting a request of HTTPGET type.

The terminal sends the HTTPGET-type data message to the server 20 in step E'5, the data message further comprising the nonces x, y, z.

The equipment 13 intercepts the data message in step E'6 and extracts the nonce x. On the basis of the public key K3 transmitted by the server 20 in step E'''0, the equipment 13 calculates an encrypted nonce x' on the basis of the nonce x using the key K3. The equipment 13 encrypts, using the key K3, the data that it must add to the data message in accordance with the function that it performs. It may for example add an address of a PCRF (Policy Rules and Control Function) server to which billing data must be sent. It encrypts this IP address using the public key K3. The equipment also modifies the data message by substituting the nonce x of the received data message with the encrypted nonce x'. The modified message to be sent to the server 20 comprises data modified using the key K3, the nonce a' encrypted with the key K3 and no longer comprises the nonce a.

It then sends the modified message to the server 20. The data message is intercepted in step E'7 by the equipment 14 which also intervenes in the message by modifying the message by adding information, for example by indicating the identity of the handler of this equipment 14. The equipment encrypts the identity to be added with the public key K2 received in step E'''0. In addition, the equipment 14 encrypts the nonce y with the public key K2 and obtains an encrypted nonce y'. The equipment 14 modifies the data message by adding the identity of the encrypted handler and by substituting the received nonce y with the encrypted nonce y'. The data message modified by the equipment 13 and then by the equipment 14 is transmitted to the server 20 that it receives in step E'8.

Since the server 20 has the private keys K'3 and K'2, it can decrypt the data modified by the equipments 13 and 14 on the path and it can also identify which equipment has modified said data on the basis of the received encrypted nonces x' and y'. Knowing that it can obtain the nonce x only with the key K'3, it can identify that the equipment 13 has encrypted the data of the message with the key K3.

The data sent by the server 20 to the terminal 10 in step E'9, following the request sent by the terminal 10, are intercepted by the same equipments 13 and 14 in steps E'10 and E'11 because it is considered that the path used for the transmission of data is bidirectional and symmetrical. The terminal receives the data in step E'12 and can decrypt the data modified by the equipments 13 and 14 because it has information on the nonces x, y, z and the private keys K'1, K'2, K'3.

This embodiment has the advantage of being able to identify the equipment which has modified data of a message for a message transmitted on a path and, moreover, it makes it possible to avoid transmitting the encryption keys in the data message.

Figure 5:
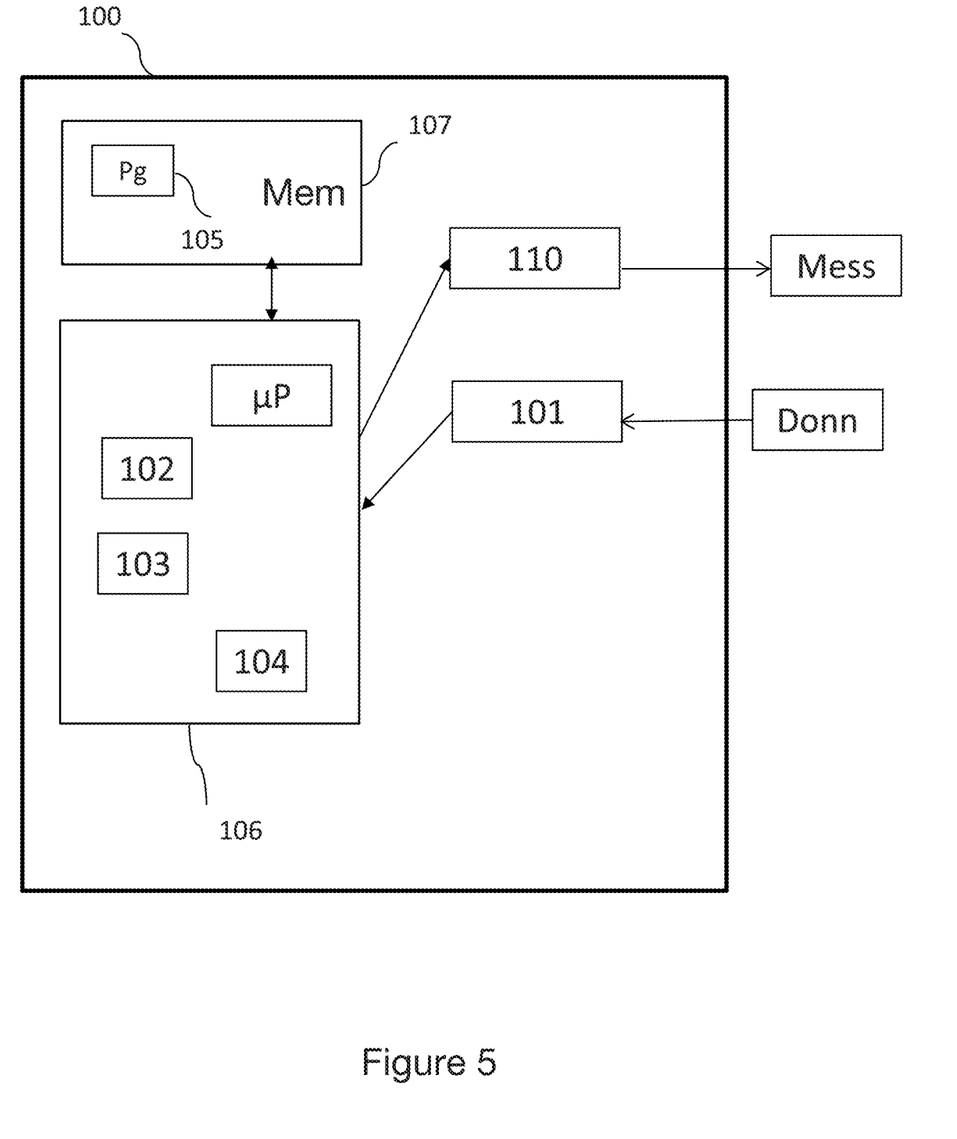
FIG. 5 shows an exemplary structure of a modification device according to one aspect of the invention.

With reference to FIG. 5, an exemplary structure of a modification device is presented, according to one aspect of the invention.

The modification device 100 implements the modification method, various embodiments of which have just been described.

Such a device 100 may be implemented in any type of equipment present on a communication path, whether this equipment is virtualized or otherwise. This may be a mobile network gateway, equipment responsible for translating IP addresses, a firewall, equipment providing DPI (Deep Packet Inspection) functions, etc.

For example, the device 100 comprises a processing unit 106, equipped for example with a microprocessor μP, and controlled by a computer program 105, stored in a memory 107 and implementing the selection method according to the invention. On initialization, the code instructions of the computer program 105 are for example loaded into a RAM memory, before being executed by the processor of the processing unit 106.

Such a device 100 comprises:
- an intercepting module 101, capable of intercepting the data message, coming from the first node and destined for the second node;
- an obtaining module 102, capable of obtaining an encryption parameter of the set from the first node;
- a determining module 103, capable of determining a cryptographic element on the basis of the parameter obtained;
- a modifying module 104, capable of modifying at least one datum in the message on the basis of the cryptographic element determined;
- a transmitter 110 capable of sending the modified data message Mess to the second node.

Figure 6:
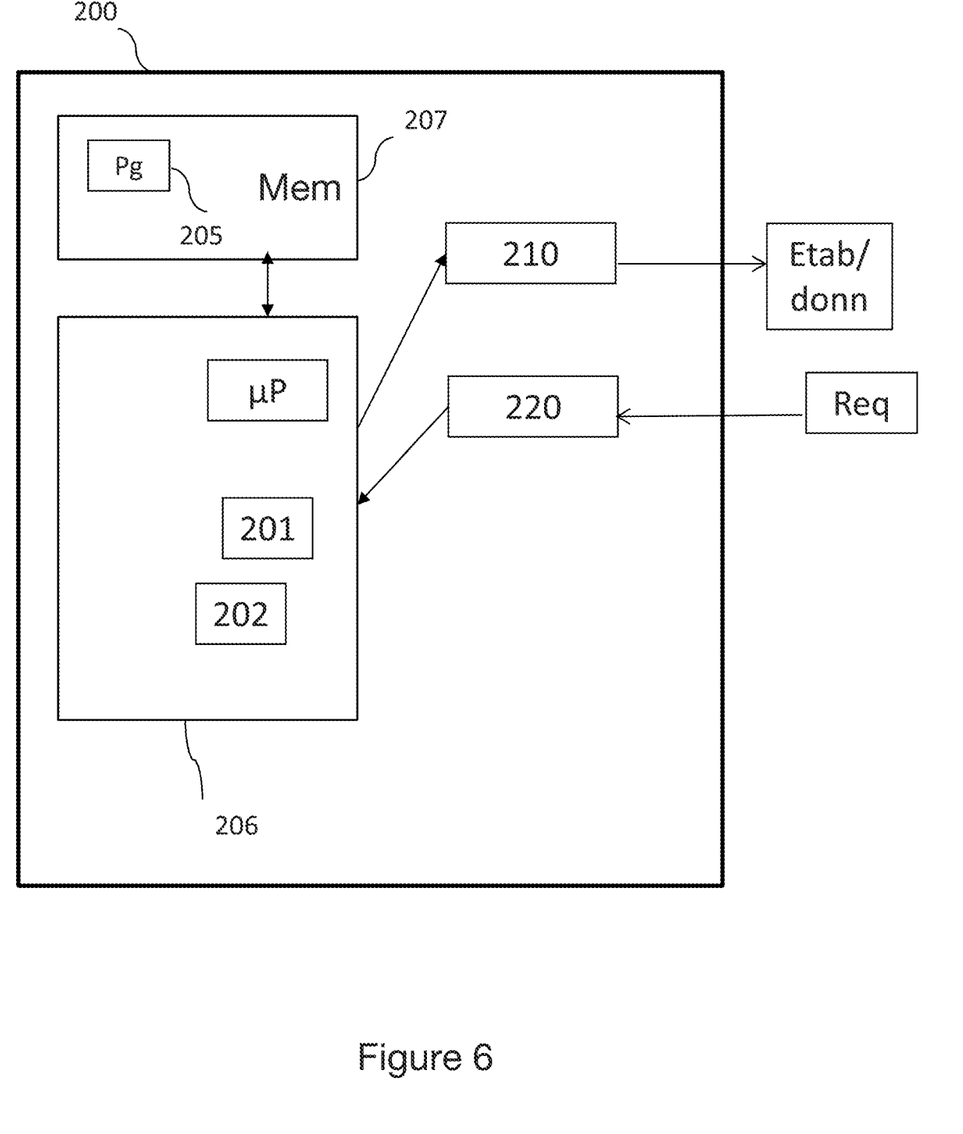
FIG. 6 shows an exemplary structure of a modification control device according to one aspect of the invention.

With reference to FIG. 6, an exemplary structure of a modification control device is presented, according to one aspect of the invention.

The modification control device 200, various embodiments of which have just been described, may be implemented in equipments of fixed or mobile terminal or home gateway type, or any type of server.

For example, the node 200 comprises a processing unit 206, equipped for example with a microprocessor pP, and controlled by a computer program 205, stored in a memory 207 and implementing the selection method according to the invention. On initialization, the code instructions of the computer program 205 are for example loaded into a RAM memory, before being executed by the processor of the processing unit 206.

Such a device 200 comprises:
- a receiver 220, capable of receiving a request message Req for the establishment of the communication path from the second node;
- a generating module 201, capable of generating a set of encryption parameters;
- a transmitter 210,
  - capable of sending an establishment response message Etab comprising the set of encryption variables to the second node;
  - capable of sending a data message Donn to the second node.
- a delivery module 202, capable of delivering an encryption parameter relating to a variable of the set to the equipment.

The modules described with reference to FIG. 5 and FIG. 6 may be hardware or software modules.

The modification method and the modification control method, various embodiments of which have just been described, make it possible to authorize equipments referred to as intermediate, present on an access network or in a core network, for example on a Wi-Fi infrastructure or GPRS/LTE/5G network, to modify data. By distributing encryption keys in data messages or in specific messages, a client or server may or may not authorize intermediate equipments to modify data, in particular by adding information to the data transmitted by the client or the server. The methods also make it possible to know which intermediate equipments have added which data to the message. The methods authorize the use of transport or application protocols to send encryption parameters, if applicable, knowing that the use of a transport protocol such as QUIC, the use of which is rapidly increasing in networks, is a judicious choice in developing the use of the methods. The methods do not call into question the security of the data since it is possible to use unencrypted fields to transport the encryption parameters and to keep encrypted the other data sent by the terminal or the server which the equipment must not modify. It is also possible to encrypt some data in a message with one key and other data in the message with other keys so as to make only certain portions of the messages accessible to equipments and thus prevent modifications made by one equipment from being able to be read or modified by another equipment on the data path.

The invention claimed is:

1. A method of modifying a data message sent by a first node to a second node on a path of a communication network comprising an equipment capable of intercepting the data message, the second node having obtained a set of encryption variables from the first node, the method executed by the equipment capable of intercepting the data message, the method comprising:
   intercepting the data message sent from the first node and destined for the second node, the data message comprising encryption parameters relating to the set of encryption variables;
   extracting one encryption parameter, specific to the equipment intercepting the data message, from the encryption parameters obtained from the first node in the data message;
   modifying at least one datum of the data message based on the extracted encryption parameter; and
   sending the modified data message to the second node.

2. The method of claim 1, further comprising a step of removing the encryption parameter from the modified data message sent to the second node.

3. The method of claim 1, wherein the encryption parameter is included in the transport layer of a packet of the data message.

4. The method of claim 1, further comprising adding the cryptographic element to the modified data message sent to the second node.

5. The method of claim 1, further comprising determining a cryptographic element relating to the obtained encryption parameter and modifying at least one datum of the data message on the basis of the determined cryptographic element.

6. The method of claim 5, wherein the cryptographic element is determined on the basis of a random number present in the received data message.

7. The method of claim 6, wherein the cryptographic element is specific to the path of the communication network.

8. A method of controlling the modification of a data message sent by a first node to a second node on a path of a communication network comprising an equipment capable of intercepting the data message, the path extending between the two nodes, the modification executed by the equipment capable of intercepting the data message, the method executed by the first node and comprising:
   receiving a request message for the establishment of a communication path from the second node;
   generating a set of encryption variables;
   sending an establishment response message comprising the generated set of encryption variables to the second node; and
   sending a data message to the second node through the equipment, the data message comprising unencrypted encryption parameters relating to the set of encryption variables, one unencrypted encryption parameter being specific to the equipment.

9. The method of claim 8, wherein the encryption parameter is a public encryption key.

10. A device for modifying a data message sent by a first node to a second node on a path of a communication network comprising an equipment capable of intercepting the data message, the path established between the two nodes, the second node having previously obtained a set of encryption variables from the first node, the device comprising a processor and a memory, the device configured to:
    intercept the data message sent from the first node and destined for the second node, the data message comprising encryption parameters relating to the set of encryption variables;
    extract one encryption parameter, specific to the equipment intercepting the message, from the encryption parameters received from the first node in the data message;
    modify at least one datum in the data message based on the extracted encryption parameter; and
    send the modified data message to the second node.

11. A device for controlling the modification of a data message sent by a first node to a second node on a path of a communication network comprising an equipment capable of intercepting the data message, the path extending between the two nodes, the modification executed by the equipment capable of intercepting the data message, the device comprising a processor and a memory, the device configured to:
    receive a request message for the establishment of the communication path from the second node;
    generate a set of encryption variables;
    transmit an establishment response message comprising the generated set of encryption variables to the second node; and
    send a data message to the second node through the equipment, the data message comprising unencrypted encryption parameters relating to the set of encryption variables, one unencrypted encryption parameter being specific to the equipment.

12. A non-transitory computer-readable recording medium comprising a computer program recorded thereon, the computer program comprising instructions for implementing a method for modifying a data message when executed by a processor of an equipment capable of intercepting the data message, the data message being sent by a first node to a second node on a path of a communication network comprising an equipment capable of intercepting the data message, the second node having obtained a set of encryption variables from the first node, wherein the instructions configure the equipment to:

intercept the data message sent from the first node and destined for the second node, the data message comprising encryption parameters relating to the set of encryption variables;

extract one encryption parameter, specific to the equipment intercepting the message, from the encryption parameters obtained from the first node in the data message;

modify at least one datum of the data message based on the extracted encryption parameter; and send the modified data message to the second node.

13. A non-transitory computer readable storage having stored thereon instructions which cause a processor to implement the method of claim 1 when the instructions are executed by a processor.

14. The method of claim 5, wherein the cryptographic element is specific to the path of a communication network.

* * * * *